2010年10月20日

United States Patent
Ochiai et al.

(10) Patent No.: US 9,855,606 B2
(45) Date of Patent: Jan. 2, 2018

(54) HOLLOW ROTATING SHAFT FINISHING METHOD AND HOLLOW ROTATING SHAFT

(71) Applicant: IHI Corporation, Tokyo (JP)

(72) Inventors: Hiroyuki Ochiai, Tokyo (JP); Yutaka Watanabe, Tokyo (JP); Masanobu Natsuake, Tokyo (JP); Kouzou Hasegawa, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 15/417,462

(22) Filed: Jan. 27, 2017

(65) Prior Publication Data

US 2017/0136548 A1 May 18, 2017

Related U.S. Application Data

(63) Continuation of application No. PCT/JP2015/070695, filed on Jul. 21, 2015.

(30) Foreign Application Priority Data

Sep. 9, 2014 (JP) .................................. 2014-182984

(51) Int. Cl.
*B23B 1/00* (2006.01)
*B23B 5/08* (2006.01)
(Continued)

(52) U.S. Cl.
CPC .................. *B23B 5/08* (2013.01); *B23B 1/00* (2013.01); *B23Q 15/04* (2013.01); *B23Q 17/20* (2013.01)

(58) Field of Classification Search
CPC ......... B23B 5/08; B23B 1/00; B23Q 11/0032; B23Q 17/20; G01M 1/08; G01M 1/34;
(Continued)

(56) References Cited

U.S. PATENT DOCUMENTS 5,274,566 A * 12/1993 Reed ...................... G01B 17/00
 700/195
5,493,763 A * 2/1996 Yamanaka ......... B23Q 11/0032
 29/27 C
(Continued)

FOREIGN PATENT DOCUMENTS

DE 1 99 58 616 A1 6/2001
JP 58-171201 A 10/1983
(Continued)

OTHER PUBLICATIONS

Written Opinion of International Searching Authority issued in PCT/JP2015/070695 dated Oct. 20, 2015.
(Continued)

*Primary Examiner* — Will Fridie, Jr.
(74) *Attorney, Agent, or Firm* — Oblon, McClelland, Maier & Neustadt, L.L.P.

(57) ABSTRACT

In the process of cutting the outer circumference 10o of a hollow rotating shaft 10 by using a finishing turning tool 36, the position of the finishing turning tool 36 is adjusted in the direction orthogonal to the virtual reference shaft center VS so that the center position CPo of the outer circumference 10o of the hollow rotating shaft 10 is deviated from the virtual reference shaft center VS in the same direction as the direction of the deviation vector $\Delta Di$ by an amount corresponding to the magnitude $|\Delta Di|$ of the deviation vector $\Delta Di$. This can reduce the unbalance to zero also in the middle of the shaft and sufficiently reduce runout of the hollow rotating shaft 10 even if the rotation speed of the hollow rotating shaft 10 increases. Accordingly, it is possible to further improve the reliability of the hollow rotating shaft 10 at high rotation speed.

7 Claims, 9 Drawing Sheets

(51) Int. Cl.
*B23Q 15/04* (2006.01)
*B23Q 17/20* (2006.01)

(58) Field of Classification Search
CPC ............... G01M 1/12; G05B 19/4086; G05B 2219/36273; G05B 2219/39276
See application file for complete search history.

(56) References Cited

U.S. PATENT DOCUMENTS

| | | | | |
|---|---|---|---|---|
| 6,065,338 | A * | 5/2000 | Stoiber | F16F 15/36 318/560 |
| 6,796,183 | B2 * | 9/2004 | Noell | B23Q 11/0032 73/593 |
| 2011/0077092 | A1 | 3/2011 | Iizuka et al. | |
| 2011/0120278 | A1 * | 5/2011 | Ochiai | B23B 1/00 82/1.11 |
| 2012/0038763 | A1 * | 2/2012 | Kawada | B23B 25/06 348/95 |
| 2013/0333531 | A1 * | 12/2013 | Koll | G05B 19/182 82/1.11 |
| 2013/0336603 | A1 * | 12/2013 | Matsunaga | F16C 27/045 384/101 |

FOREIGN PATENT DOCUMENTS

| | | |
|---|---|---|
| JP | 63-156646 A | 6/1988 |
| JP | 6-335801 A | 12/1994 |
| JP | 7-136801 A | 5/1995 |
| JP | 7-167731 A | 7/1995 |
| JP | 8-504133 A | 5/1996 |
| JP | 2000-320615 A | 11/2000 |
| JP | 2003-251543 A | 9/2003 |
| JP | 2011-73525 A | 4/2011 |
| JP | 2014-508047 A | 4/2014 |
| WO | 2010/010845 A1 | 1/2010 |

OTHER PUBLICATIONS

International Search Report issued in PCT/JP2015/070695 dated Oct. 20, 2015 (English Translation).

* cited by examiner

HOLLOW ROTATING SHAFT FINISHING METHOD AND HOLLOW ROTATING SHAFT

CROSS REFERENCE TO RELATED APPLICATIONS

This application is a continuation application of international application No. PCT/JP2015/070695 filed Jul. 21, 2015, which claims priority to Japanese Patent Application No. 2014-182984 filed Sep. 9, 2014, each of which is hereby incorporated by reference in their entity.

BACKGROUND

1. Technical Field

The present disclosure relates to a hollow rotating shaft finishing method to finish the outer circumference of a hollow rotating shaft having a predetermined inner diameter to a predetermined outer diameter in the axial direction (in the axial direction of the hollow rotating shaft) or the like.

2. Description of Related Art

To finish the outer circumference of a hollow rotating shaft, such as a turbine shaft used in a gas turbine, to a predetermined outer diameter in the axial direction, the following process is generally performed.

First, a virtual reference shaft center is set to process the outer circumference of the hollow rotating shaft. Next, a cutting tool is used to cut the outer circumference of the hollow rotating shaft in the axial direction by giving a cut to the cutting tool and moving the cutting tool in the axial direction relatively to the hollow rotating shaft while rotating the hollow rotating shaft about the virtual reference shaft center. Subsequently, the amount of unbalance is measured at each end of the hollow rotating shaft in the axial direction with a dynamic balancing machine at a rotation speed smaller than the actual rotation speed. Based on the result of measurement, balance lands at both ends of the hollow rotating shaft in the axial direction are cut for balancing of the hollow rotating shaft.

The conventional arts relating to the present disclosure include techniques illustrated in Patent Documents 1 to 3.

RELATED ART DOCUMENT

Patent Document 1: JP 2011-73525 A
Patent Document 2: JP 2000-320615 A
Patent Document 3: JP H07-167731 A

SUMMARY

As described above, the hollow rotating shaft is balanced by cutting the balance land at each end of the hollow rotating shaft in the axial direction. Accordingly, the middle part of hollow rotating shaft in the axial direction tends to remain unbalanced. When the hollow rotating shaft is used in the rotary machine, such as a gas turbine, an increase in rotation speed of the hollow rotating shaft could increase runout of the middle part of the hollow rotating shaft in the axial direction. It is therefore desired to further improve the reliability of the hollow rotating shaft at high rotation speed.

An object of the present disclosure is to provide a hollow rotating shaft finishing method of a new configuration and the like which are capable of solving the aforementioned problem.

A first aspect of the present disclosure is a hollow rotating shaft finishing method (a method of finishing a hollow rotating shaft) to finish the outer circumference (outer circumferential surface) of a hollow rotating shaft having a predetermined inner diameter to a predetermined outer diameter in the axial direction of the hollow rotating shaft, the method including: a setting step of setting a virtual reference shaft center for processing the outer circumference of the hollow rotating shaft; a measurement step of measuring a deviation vector (the direction and magnitude of the deviation vector) of the center position of the inner circumference (inner circumferential surface) of the hollow rotating shaft with respect to the virtual reference shaft center in the axial direction after the setting step; and a cutting step of using a cutting tool to cut the outer circumference of the hollow rotating shaft in the axial direction after the measurement step by giving a cut to the cutting tool while rotating the hollow rotating shaft about the virtual reference shaft center and moving the cutting tool relatively to the hollow rotating shaft in the axial direction while adjusting the position of the cutting tool in the direction orthogonal to the virtual reference shaft center so that the center position (actual processing center) of the outer circumference of the hollow rotating shaft is deviated from the virtual reference shaft center in the same direction as the direction (the direction of deviation) of the deviation vector of the inner circumference by an amount (the amount of deviation) corresponding to the magnitude of the deviation vector of the inner circumference.

Herein, the amount corresponding to the magnitude of the deviation vector of the inner circumference is equal to any one of (the magnitude of the deviation vector of the center position of the inner circumference) multiplied by (a predetermined inner diameter)$^2$/(a predetermined outer diameter)$^2$) and the magnitude of the deviation vector of the inner circumference.

In the specification and claims of the application, the axial direction refers to the axial direction of the hollow rotating shaft. The "predetermined inner diameter" refers to an inner diameter previously configured, and the value (the predetermined value of the inner diameter) thereof does not need to be constant in the axial direction. The "predetermined outer diameter" refers to an outer diameter previously configured, and the value (the predetermined value of the outer diameter) thereof does not need to be constant in the axial direction. "To measure" refers to direct measurement and calculation based on the results of measurement". The cutting tool includes a turning tool, a cutting wheel (a grinding wheel), and the like.

According to the characteristics of the present disclosure, in the process of cutting the outer circumference of the hollow rotating shaft in the axial direction, the position of the cutting tool is adjusted in the direction orthogonal to the virtual reference shaft center so that the center position of the outer circumference of the hollow rotating shaft is deviated from the virtual reference shaft center in the same direction as the deviation vector by an amount corresponding to the magnitude of the deviation vector. This can reduce unbalance of the hollow rotating shaft to zero or close to zero in the axial direction. In other words, it is possible to reduce unbalance to zero or close to zero in the middle of the hollow rotating shaft in the axial direction as well as at both ends of the hollow rotating shaft in the axial direction.

According to the present disclosure, it is possible to reduce unbalance to zero or close to zero at both ends and in the middle of the hollow rotating shaft in the axial direction. In the case of using the hollow rotating shaft in a rotary machine, it is possible to sufficiently reduce runout of the hollow rotating shaft even when the rotation speed of the hollow rotating shaft increases, thus further improving the reliability of the hollow rotating shaft at high rotation speed.

DETAILED DESCRIPTION OF EMBODIMENTS

Hereinafter, a description is given of an embodiment of the present disclosure with reference to the drawings.

Figure 7:
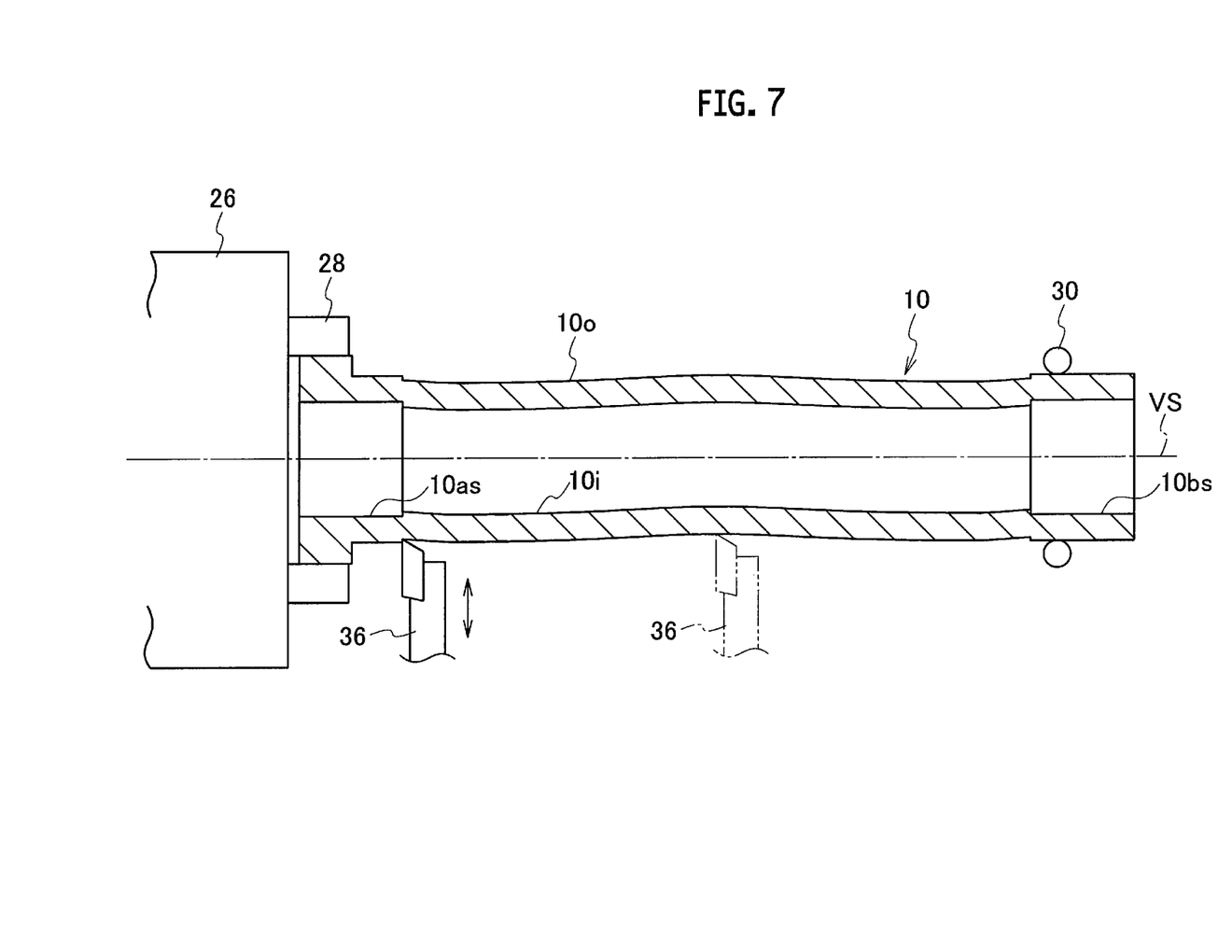
FIG. 7 is a schematic top view of the machining center or lathe for balancing, illustrating a measurement step in the hollow rotating shaft finishing method according to the embodiment of the disclosure.

As illustrated in FIGS. 1 and 7 and other drawings, a hollow rotating shaft finishing method (a method of finishing a hollow rotating shaft) according to the embodiment of the present disclosure is a method to finish an outer circumference (outer circumferential surface) 10o of the hollow rotating shaft 10, which has a predetermined inner diameter Ri, to a predetermined outer diameter Ro in the axial direction (the axial direction of the hollow rotating shaft 10). The hollow rotating shaft finishing method according to the embodiment of the present disclosure includes (i) a setting step, (ii) an intermediate cutting step, (iii) a measurement step, and (iv) a cutting step. Herein, the follow rotating shaft 10 as a target to be finished by the hollow rotating shaft finishing method according to the embodiment of the present disclosure, which is schematically illustrated, is a low-pressure turbine shaft used in an aircraft gas turbine as illustrated in Japanese Unexamined Patent Application Publication No. 2000-320615 (Patent Literature 2 described above), for example. The concrete contents of each step of the hollow rotating shaft finishing method are as follows.

(i) Measurement Step

As illustrated in FIGS. 1A to 1D, the hollow rotating shaft 10 is set horizontally on a pair of shaft supporting mechanisms 12 and 14 of an inner diameter runout-measuring device (partially illustrated). Next, a runout gauge 16, such as an indicator, is used to measure runout of the inner circumference (inner circumferential surface) 10i of the hollow rotating shaft 10 with respect to the reference position (indicated by dashed and dotted lines) at both ends and in the middle of the hollow rotating shaft 10 in the axial direction while rotating the hollow rotating shaft 10 about the shaft center 10c (the shaft center of the hollow rotating shaft 10). Based on the results of measurement from the runout gauge 16, a virtual reference shaft center VS (see FIG. 2) for processing of the outer circumference 10o of the hollow rotating shaft 10 is tentatively set by placing an emphasis on the runout in the middle of the inner circumference 10i of the hollow rotating shaft 10 in the axial direction. The hollow rotating shaft 10 is detached from the inner diameter runout-measuring device by releasing the support of the pair of shaft supporting mechanisms 12 and 14.

Figure 1A:
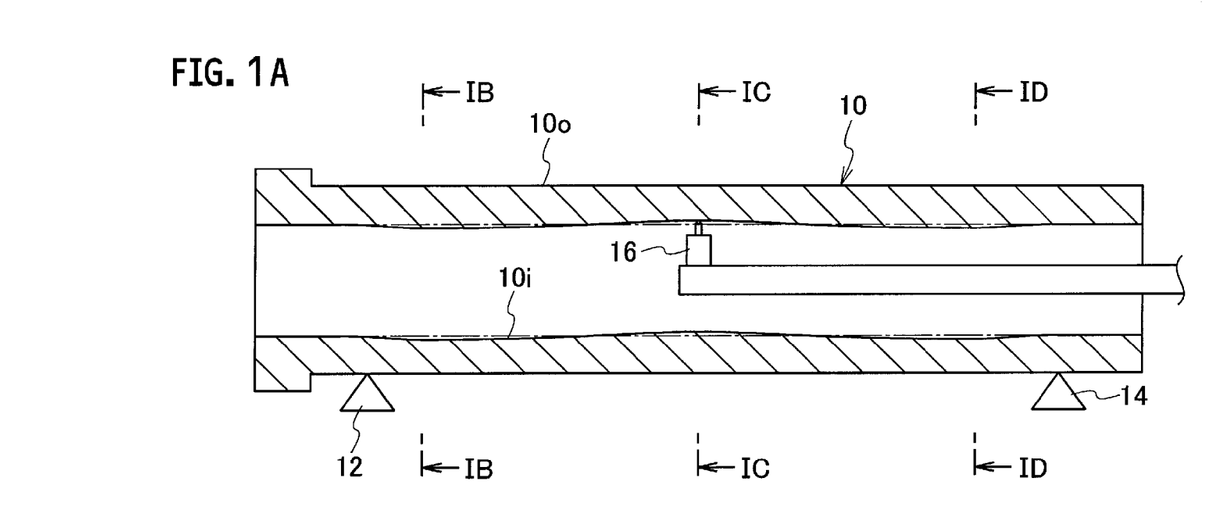
FIG. 1A is a schematic front view of a device of measuring run-out of the inner circumference, illustrating a setting step in a hollow rotating shaft finishing method according to an embodiment of the disclosure.
Figure 1B:
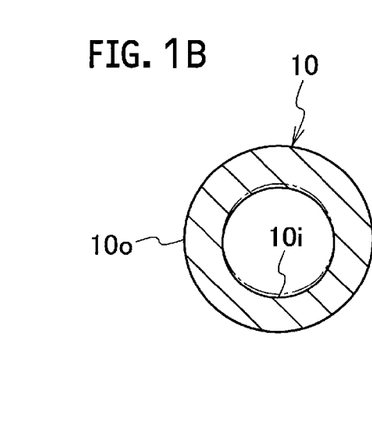
FIG. 1B is a view taken along a line IB-IB in FIG. 1A.
Figure 1C:
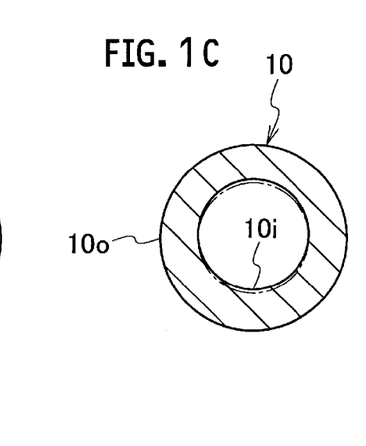
FIG. 1C is a view taken along a line IC-IC in FIG. 1A.
Figure 1D:
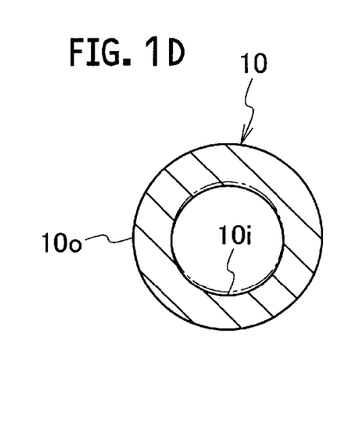
FIG. 1D is a view taken along a line ID-ID in FIG. 1A.
Figure 2:
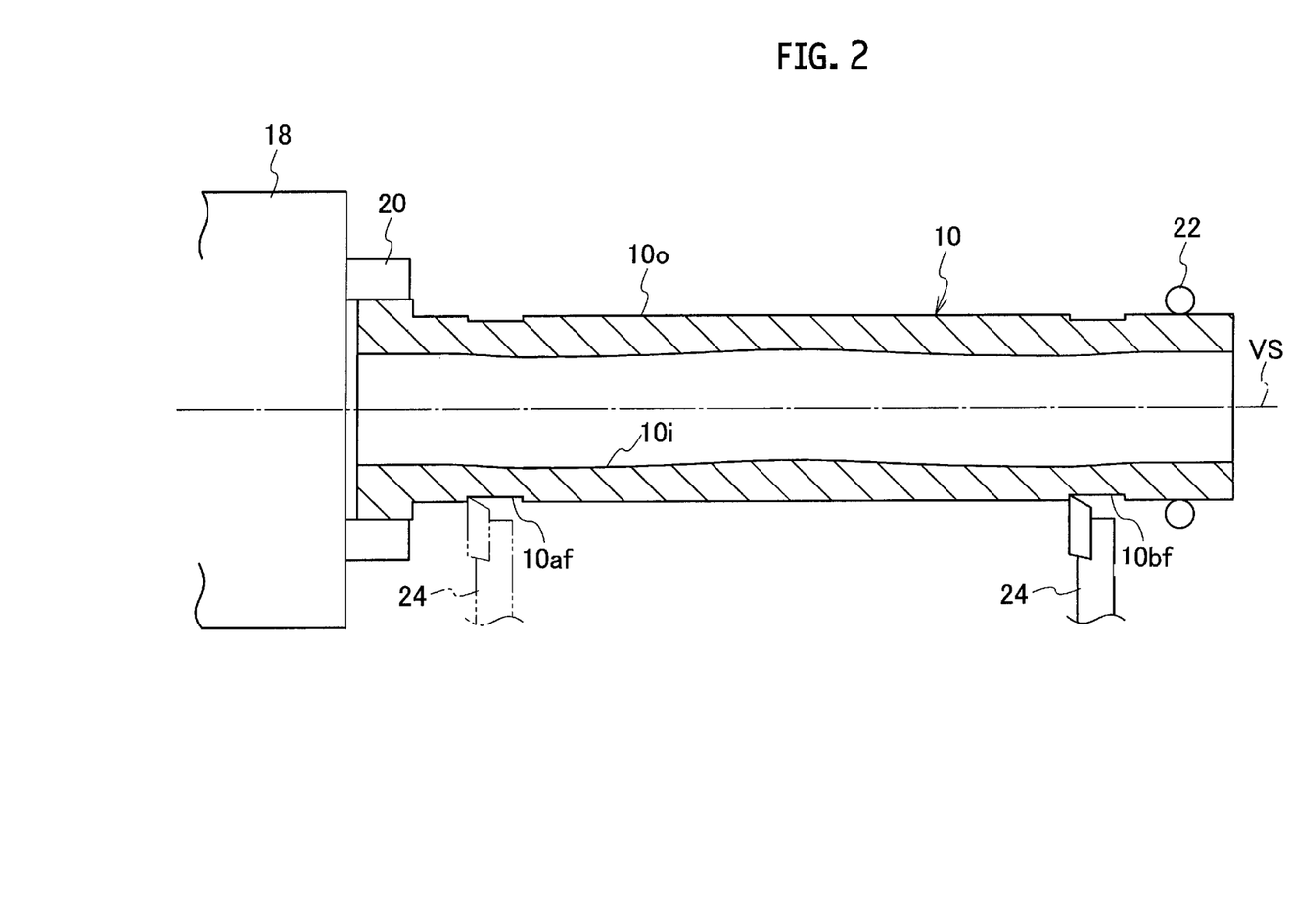
FIG. 2 is a schematic top view of a machining center or a lathe, illustrating the setting step in the hollow rotating shaft finishing method according to the embodiment of the disclosure.

After the hollow rotating shaft 10 is detached from the inner diameter runout-measuring device, as illustrated in FIG. 2, an end of the outer circumference 10o of the hollow rotating shaft 10 in the axial direction is gripped with a chuck 20 of a main shaft 18 of a machining center or lathe (partially illustrated). The shaft center of the main shaft 18 is coincident with the virtual reference shaft center VS of the hollow rotating shaft 10. The other end of the outer circumference 10o of the hollow rotating shaft 10 is rotatably supported with a steady rest 22 of the machining center or lathe. The hollow rotating shaft 10 is thus set at a predetermined position of the machining center or lathe.

After the hollow rotating shaft 10 is set in the machining center or lathe, a turning tool 24 is used to perform cutting at both ends of the outer circumference 10o of the hollow rotating shaft 10 in the axial direction by giving a cut to the turning tool 24 while rotating the hollow rotating shaft 10 integrally with the main shaft 18 about the virtual reference shaft center VS. Reference faces 10af and 10bf to specify the virtual reference shaft center VS are thus formed at both ends of the outer circumference 10o of the hollow rotating shaft 10 in the axial direction, thus finally setting the virtual reference shaft center VS.

(ii) Intermediate Cutting Step

Figure 3:
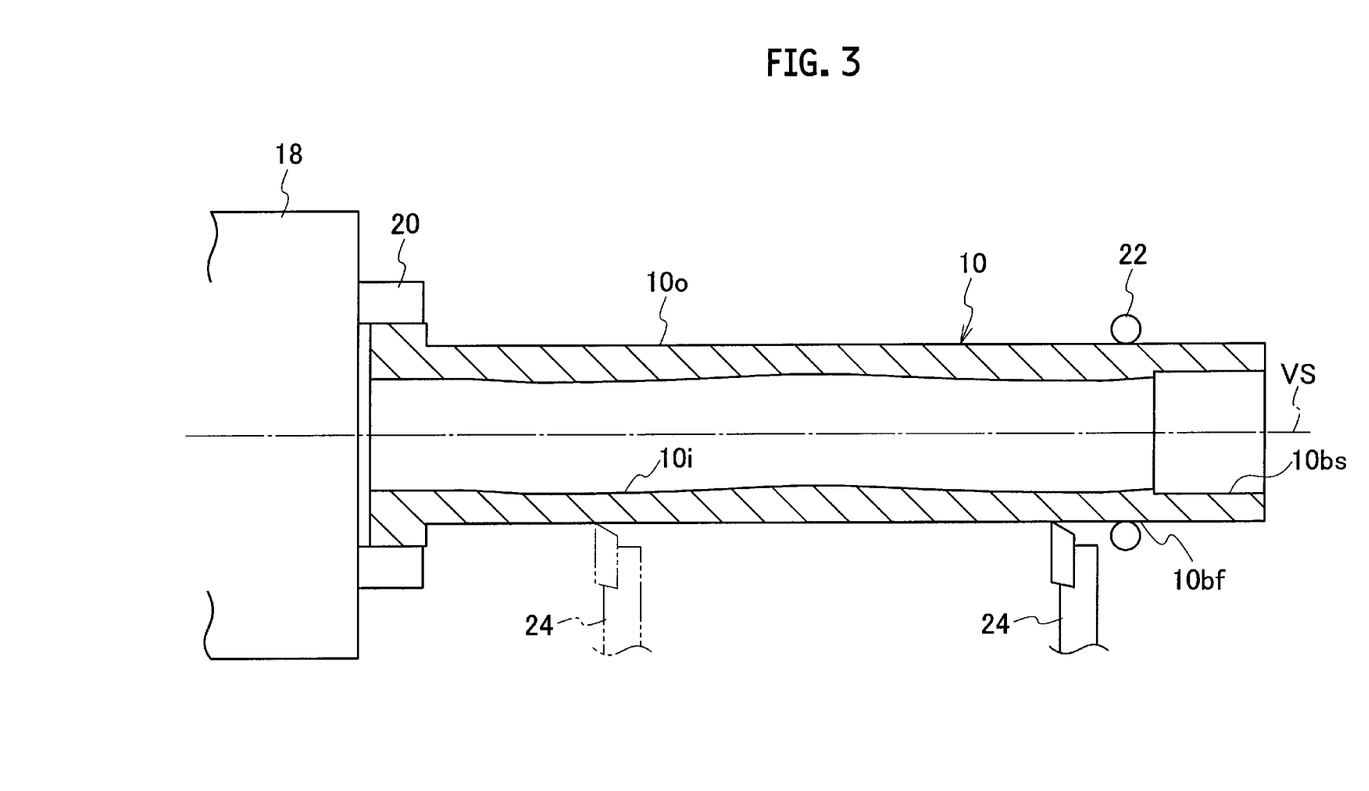
FIG. 3 is a schematic top view of the machining center or lathe, illustrating an intermediate cutting step in the hollow rotating shaft finishing method according to the embodiment of the disclosure.

After the measurement step, as illustrated in FIG. 3, the position of the steady rest 22 in the axial direction (in the direction of the virtual reference shaft center VS) is adjusted so that the steady rest 22 rotatably supports the reference face 10*bf* of the hollow rotating shaft 10. While the hollow rotating shaft 10 is rotated integrally with the main shaft 18 about the virtual reference shaft center VS, the turning tool 24 is given a cut and is moved in the axial direction for intermediate cutting of a part of the outer circumference 10*o* of the hollow rotating shaft 10 with a finishing allowance for cutting left excepting the end thereof. Moreover, a cutting tool (not illustrated) for inner diameter processing is used to perform inner diameter finishing for the other end of the inner circumference 10*i* of the hollow rotating shaft 10 in the axial direction, thus forming an inner diameter end 10*bs*.

Figure 4:
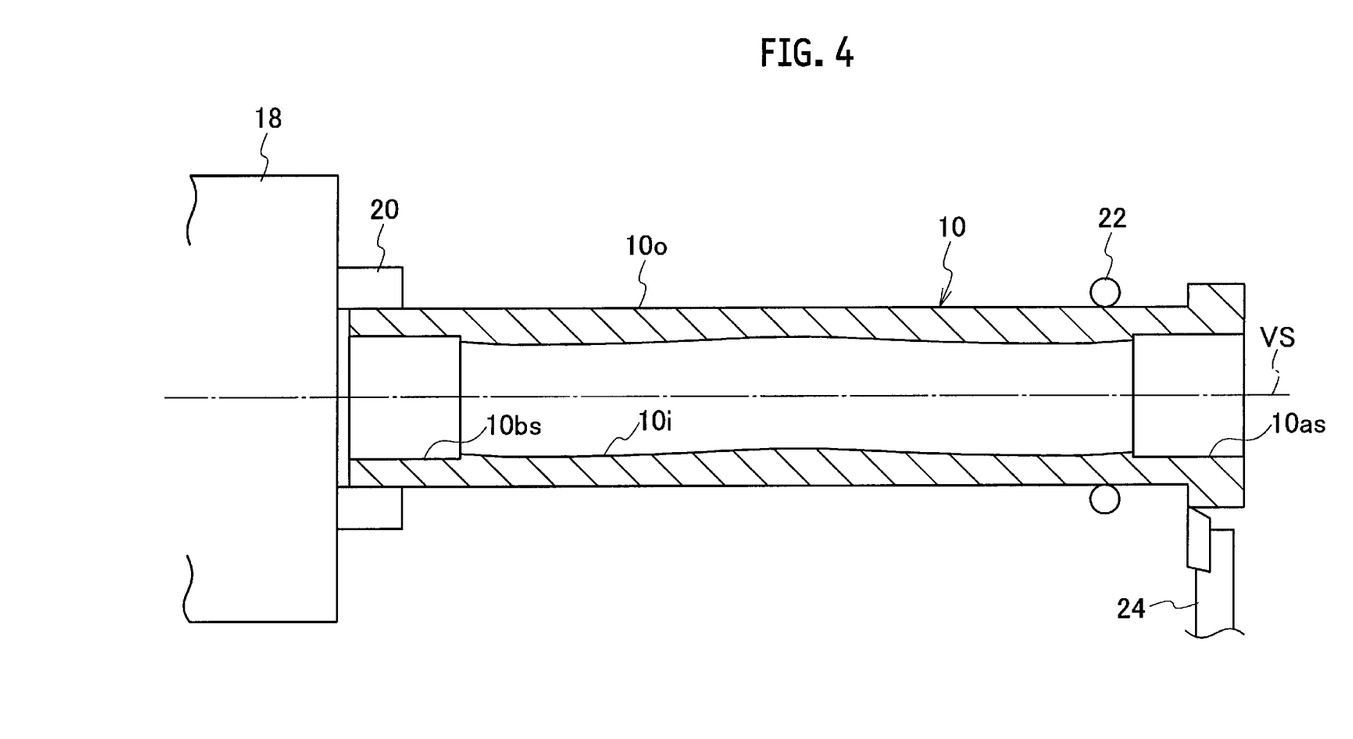
FIG. 4 is a schematic top view of the machining center or lathe, illustrating the intermediate cutting step in the hollow rotating shaft finishing method according to the embodiment of the disclosure.

Subsequently, the grip of the chuck 20 of the main shaft 18 and the support of the steady rest 22 are released, and an end of the outer circumference 10*o* of the hollow rotating shaft 10 is gripped with the chuck 20 of the main shaft 18 as illustrated in FIG. 4. The other end of the hollow rotating shaft 10 is rotatably supported with the steady rest 22. While the hollow rotating shaft 10 is rotated integrally with the main shaft 18 about the virtual reference shaft center VS, the turning tool 24 is given a cut and is moved in the axial direction for cutting of the end of the outer circumference 10*o* of the hollow rotating shaft 10. Furthermore, a cutting tool for inner diameter processing is used to perform inner diameter finishing for the end of the inner circumference 10*i* of the hollow rotating shaft 10 in the axial direction, thus forming an inner diameter end 10*as*. The grip of the chuck 20 of the main shaft 18 and the support of the steady rest 22 are released, and the hollow rotating shaft 10 is detached from the machining center or lathe.

(iii) Measurement Step

Figure 5:
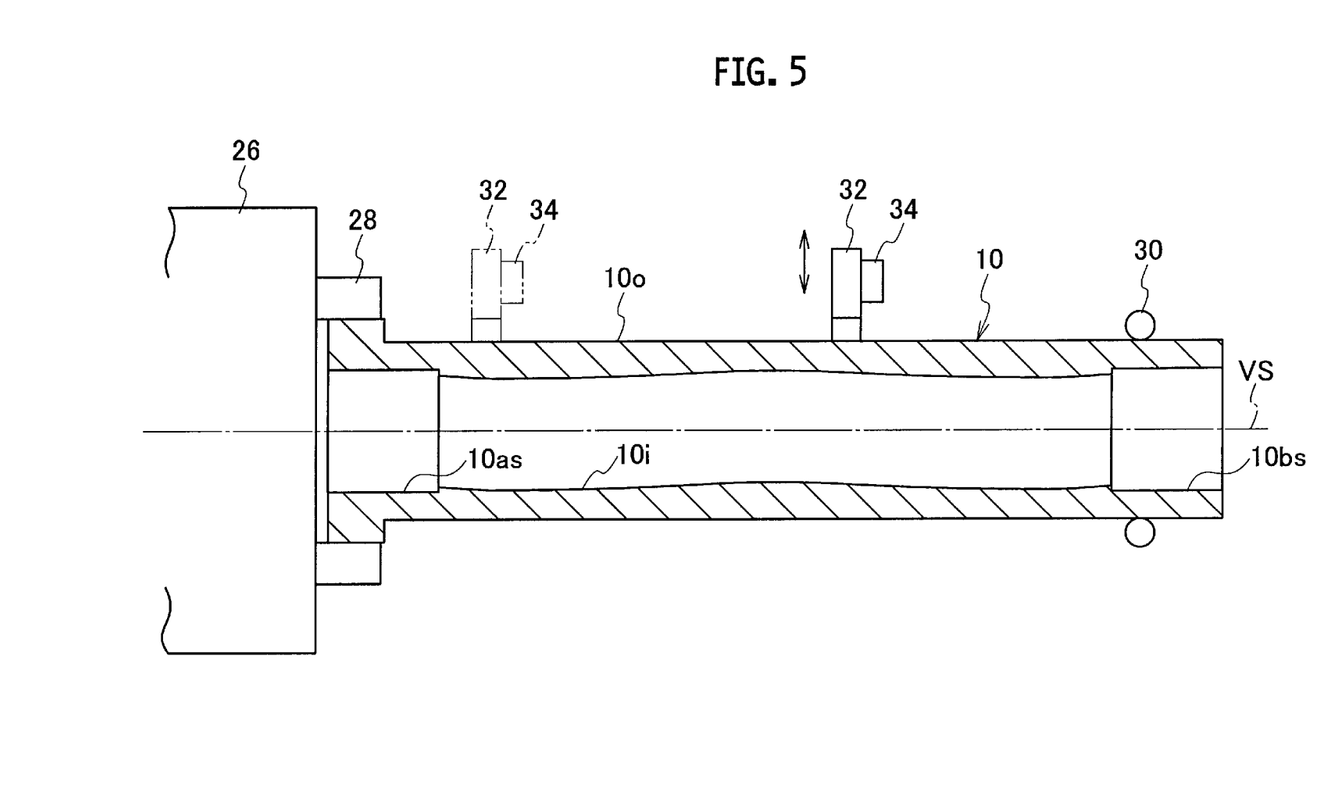
FIG. 5 is a schematic top view of a machining center or a lathe for balancing, illustrating a measurement step in the hollow rotating shaft finishing method according to the embodiment of the disclosure.

After the intermediate cutting step, as illustrated in FIG. 5, the end of the outer circumference 10*o* of the hollow rotating shaft 10 is gripped with a chuck 28 of a main shaft 26 of a machining center or lathe (partially illustrated) for balancing so that the shaft center of the main shaft 26 is coincident with the virtual reference shaft center VS of the hollow rotating shaft 10. The other end of the outer circumference 10*o* of the hollow rotating shaft 10 is rotatably supported by a steady rest 30 of the machining center or lathe for balancing. The hollow rotating shaft 10 is thereby set at the predetermined position of the machining center or lathe for balancing.

Figure 6A:
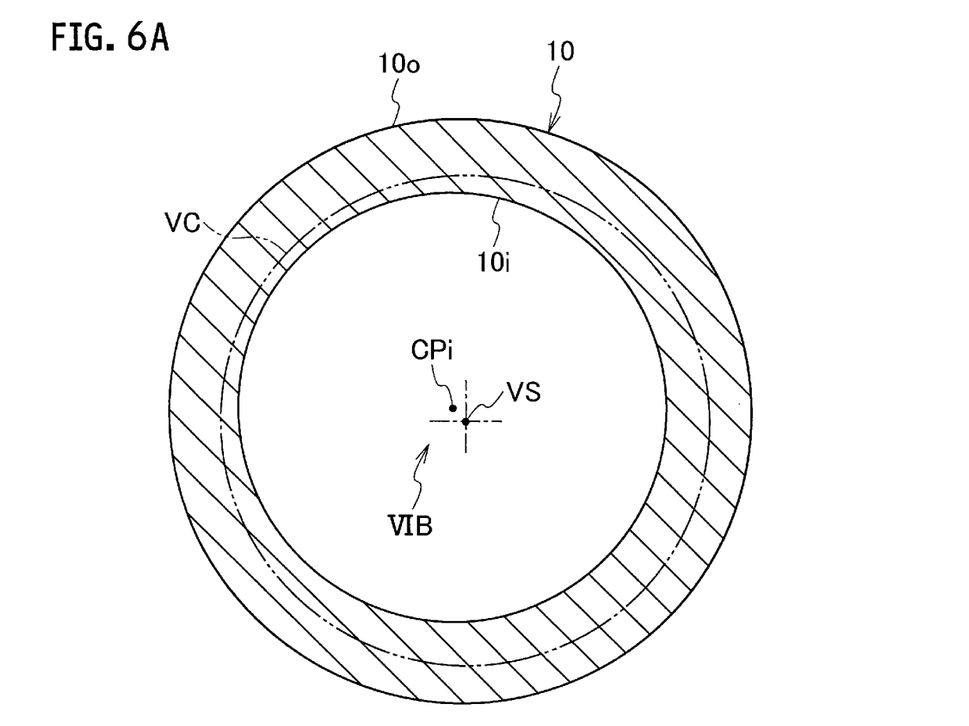
FIG. 6A is a view illustrating any intermediate cross section between both ends of the hollow rotating shaft in the axial direction after the intermediate cutting step.
Figure 6B:
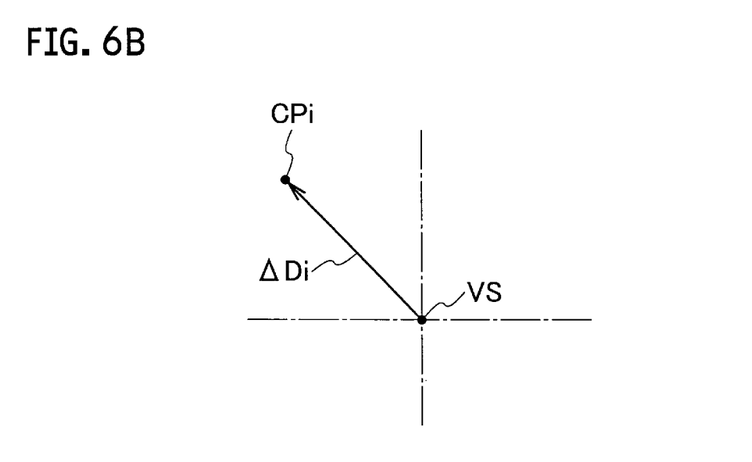
FIG. 6B is an enlarged view of a part indicated by an arrow VIB.

After the hollow rotating shaft 10 is set at the predetermined position of the machining center or lathe for balancing, an ultrasonic contact 32, which is movable in the direction orthogonal to the virtual reference shaft center VS, is used to measure variations in thickness of the hollow rotating shaft 10 in the circumferential direction (in the circumferential direction of the hollow rotating shaft 10) by bringing the ultrasonic contact 32 into contact with the outer circumference 10*o* of the hollow rotating shaft 10 through an ultrasonic contact medium, such as water, for example while rotating the hollow rotating shaft 10 integrally with the main shaft 26 about the virtual reference shaft center VS. A position measuring device 34, such as a laser displacement meter, for example, which is provided for the ultrasonic contact 32, is used to measure circumferential variations in position of the ultrasonic contact 32 in the direction orthogonal to the virtual reference shaft center VS. The measurements by the ultrasonic contact 32 and position measuring device 34 are continuously or intermittently performed in the axial direction. Based on the results of measurement from the ultrasonic contact 32 and position measuring device 34, a deviation vector $\Delta Di$ (the direction and magnitude of the deviation vector $\Delta Di$) of a center position CPi of the inner circumference 10*i* of the hollow rotating shaft 10 with respect to the virtual reference shaft center VS is calculated in the axial direction by a controller (not illustrated) of the machining center or lathe for balancing. In other words, the deviation vector $\Delta Di$ of the center position CPi of the inner circumference 10*i* of the hollow rotating shaft 10 with respect to the virtual reference shaft center VS is calculated in the axial direction using the ultrasonic contact 32 and position measuring device 34 (see FIGS. 6A and 6B). FIG. 6A illustrates a virtual circle VC about the virtual reference shaft center VS.

Herein, the deviation vector $\Delta Di$ of the center position of the inner circumference 10*i* of the hollow rotating shaft 10 with respect to the virtual reference shaft center VS may be calculated in the axial direction by using the runout gauge 16 such as an indicator instead of the ultrasonic contact 32 and position measuring device 34.

(iv) Cutting Step

Figure 8A:
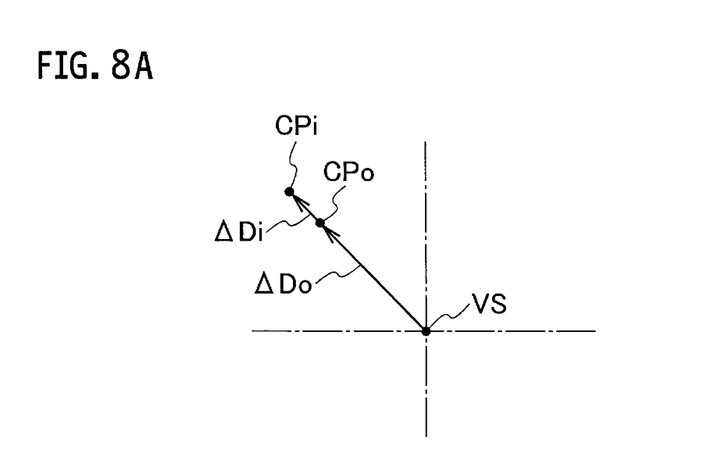
FIG. 8A is an enlarged view illustrating a case where a deviation vector of the center position of the outer circumference of the hollow rotating shaft with respect to the virtual reference shaft center has a magnitude equal to the $Ri^2/Ro^2$ multiplied by the magnitude of the deviation vector of the center position of the inner circumference of the hollow rotating shaft.
Figure 9A:
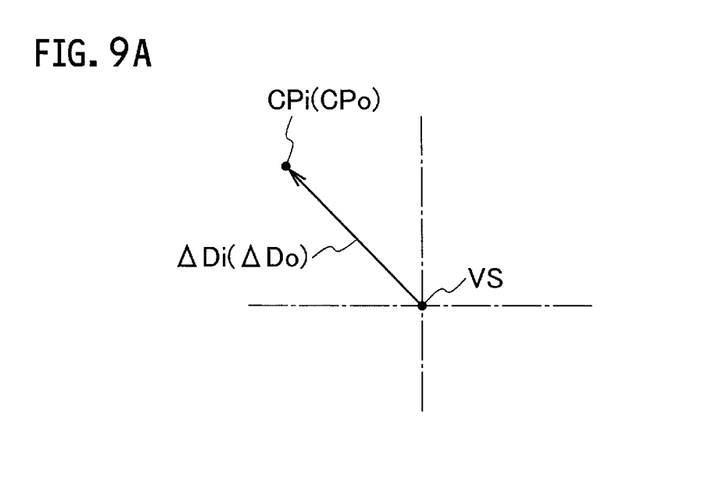
FIG. 9A is an enlarged view illustrating a case where the deviation vector of the center position of the outer circumference of the hollow rotating shaft with respect to the virtual reference shaft center has a magnitude equal to the magnitude of the deviation vector of the center position of the inner circumference of the hollow rotating shaft.

After the measurement step, as illustrated in FIG. 7, a finishing turning tool 36, which is movable in the direction orthogonal to the virtual reference shaft center VS through drive of a servomotor (not illustrated), is used to cut the outer circumference 10*o* of the hollow rotating shaft 10 in the axial direction by giving a cut to the finishing turning tool 36 and moving the finishing turning tool 36 in the axial direction while rotating the hollow rotating shaft 10 integrally with the main shaft 26 about the virtual reference shaft center VS. In this process, the position of the finishing turning tool 36 is adjusted in the direction orthogonal to the virtual reference shaft center VS through drive of the servomotor so that a center position (the real processing center) CPo of the outer circumference 10*o* of the hollow rotating shaft 10 is deviated from the virtual reference shaft center VS in the same direction as the direction (the direction of deviation) of the deviation vector $\Delta Di$ by an amount corresponding to the magnitude (an amount of deviation) $|\Delta Di|$ of the deviation vector $\Delta Di$ (see FIGS. 8A and 9A). Herein, the amount corresponding to the magnitude $|\Delta Di|$ of the deviation vector $\Delta Di$, in other words, the magnitude $|\Delta Do|$ of the deviation vector $\Delta Do$ of the center position CPo of the outer circumference 10*o* of the hollow rotating shaft 10 with respect to the virtual reference shaft center VS is equal to any one of (the magnitude $|\Delta Di|$ of the deviation vector $\Delta Di) \cdot (Ri^2/Ro^2)$ (see FIG. 8A) and the magnitude $|\Delta Di|$ of the deviation vector $\Delta Di$ (see FIG. 9A).

It is therefore possible to finish the outer circumference 10*o* of the hollow rotating shaft 10 to a predetermined outer diameter Ro in the axial direction as removing or reducing the unbalance of the hollow rotating shaft 10.

Next, a description is given of the operation and effect of the embodiment of the present disclosure.

In the process of cutting the outer circumference 10*o* of the hollow rotating shaft 10 in the axial direction using the finishing turning tool 36, the position of the finishing turning tool 36 is adjusted in the direction orthogonal to the virtual reference shaft center VS so that the center position CPo of the outer circumference 10*o* of the hollow rotating shaft 10 is deviated from the virtual reference shaft center VS in the same direction as the deviation vector $\Delta Di$ by an amount corresponding to the magnitude $|\Delta Di|$ of the deviation vector $\Delta Di$. Accordingly, unbalance of the hollow rotating shaft 10 can be reduced to zero or close to zero in the axial direction. In other words, the unbalance can be reduced to zero or close to zero not only at both ends of the hollow rotating shaft 10 in the axial direction but also at the middle of the hollow rotating shaft 10 in the axial direction.

Figure 8B:
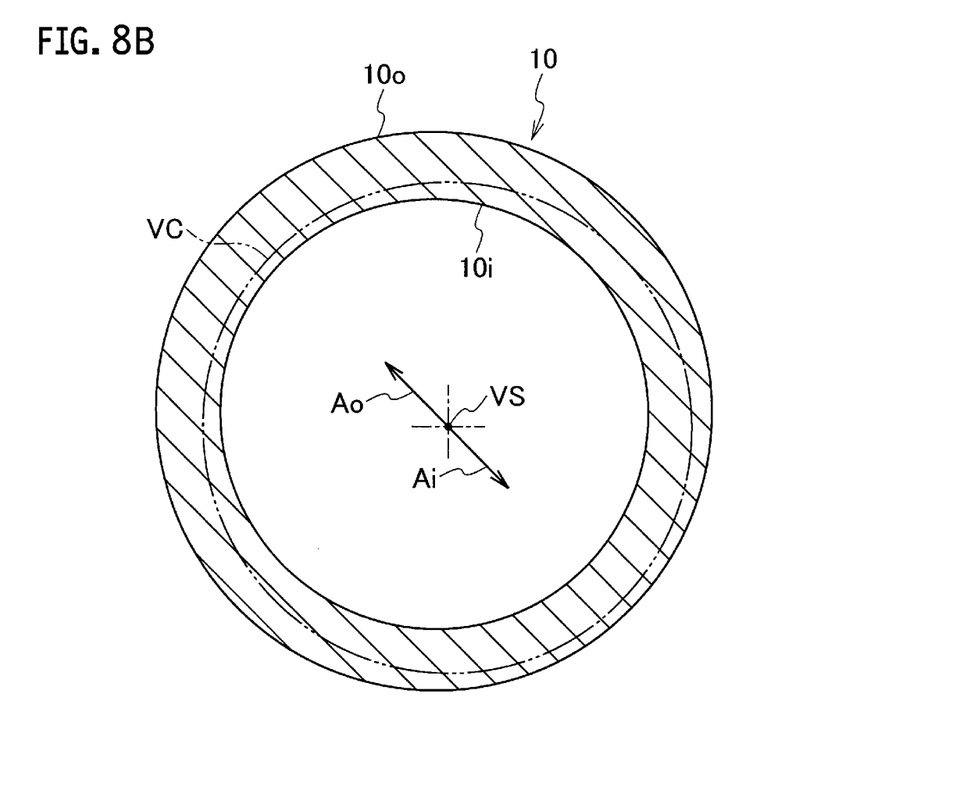
FIG. 8B is a view of any given intermediate cross-section between both ends of the hollow rotating shaft in the axial direction, the view illustrating unbalance per unit length in inner part of the hollow rotating shaft and unbalance per unit length in outer part of the hollow rotating shaft.
Figure 9B:
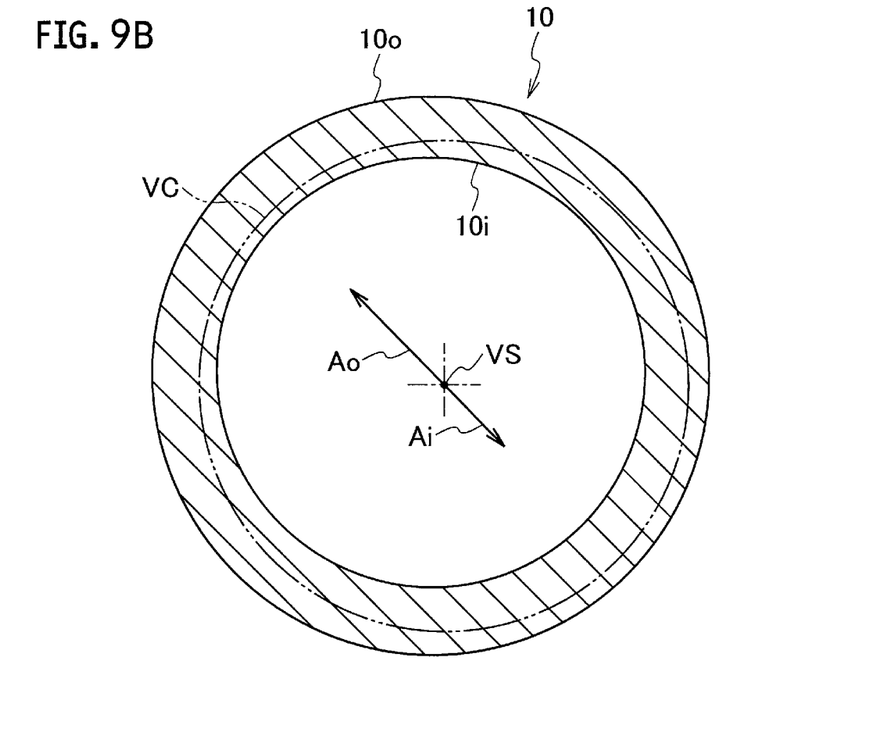
FIG. 9B is a view of any given intermediate cross-section between both ends of the hollow rotating shaft in the axial direction, the view illustrating unbalance per unit length in inner part of the hollow rotating shaft and unbalance per unit length in outer part of the hollow rotating shaft.

To be more specific, as illustrated in FIGS. 8B and 9B, in any given intermediate cross-section between both ends of the hollow rotating shaft 10 in the axial direction, the direction of an unbalance Ai of the inner part per unit length from the virtual circle VC to the inner circumference $10i$ in the hollow rotating shaft 10 is opposite to the direction of the deviation vector $\Delta Di$, and the magnitude of the unbalance Ai is $|\Delta Di|\cdot\pi Ri^2$. Moreover, the direction of an unbalance Ao of the outer part per unit length from the virtual circle VC to the outer circumference $10o$ in the hollow rotating shaft 10 is the same as the direction of the deviation vector $\Delta Do$, and the magnitude of the unbalance Ao is equal to $|\Delta Do|\cdot\pi Ro^2$. If the magnitude $|\Delta Do|$ of the deviation vector $\Delta Do$ is $|\Delta Di|\cdot(Ri^2/Ro^2)$ as illustrated in FIG. 8B, the unbalance Ai is canceled by the unbalance Ao, and the unbalance of the hollow rotating shaft 10 becomes zero. If the magnitude $|\Delta Do|$ of the deviation vector $\Delta Do$ is equal to the magnitude $|\Delta Di|$ of the deviation vector $\Delta Di$ as illustrated in FIG. 9B, the unbalance of the hollow rotating shaft 10 cannot be zero but is close to zero.

According to the embodiment of the present disclosure, the unbalance of the hollow rotating shaft 10 can be equal to or close to zero at both ends and in the middle of the hollow rotating shaft 10 in the axial direction. When the hollow rotating shaft 10 is used in an aircraft gas turbine, runout of the hollow rotating shaft 10 is sufficiently reduced even if the rotation speed of the hollow rotating shaft 10 increases. It is therefore possible to further improve the reliability of the hollow rotating shaft 10 at high rotation speed.

The present disclosure is not limited to the description of the aforementioned embodiment and can be implemented in various modes. The scope of right in the present disclosure includes the hollow rotating shaft 10 finished by the hollow rotating shaft finishing method.

The invention claimed is:

1. A hollow rotating shaft finishing method to finish the outer circumference of a hollow rotating shaft having a predetermined inner diameter to a predetermined outer diameter in the axial direction of the hollow rotating shaft, the method comprising:
    a setting step of setting a virtual reference shaft center for processing the outer circumference of the hollow rotating shaft;
    a measurement step of measuring a deviation vector of the center position of the inner circumference of the hollow rotating shaft with respect to the virtual reference shaft center after the setting step; and
    a cutting step of using a cutting tool to cut the outer circumference of the hollow rotating shaft in the axial direction after the measurement step by giving a cut to the cutting tool while rotating the hollow rotating shaft about the virtual reference shaft center and moving the cutting tool relatively to the hollow rotating shaft in the axial direction while adjusting the position of the cutting tool in the direction orthogonal to the virtual reference shaft center so that the center position of the outer circumference of the hollow rotating shaft is deviated from the virtual reference shaft center in the same direction as the direction of the deviation vector of the center position of the inner circumference by an amount corresponding to the magnitude of the deviation vector of the center position of the inner circumference.

2. The hollow rotating shaft finishing method according to claim 1, wherein the amount corresponding to the magnitude of the deviation vector is equal to the magnitude of the deviation vector of the center position of the inner circumference multiplied by (a predetermined inner diameter)$^2$/(a predetermined outer diameter)$^2$).

3. The hollow rotating shaft finishing method according to claim 1, wherein the amount corresponding to the magnitude of the deviation vector is equal to the magnitude of the deviation vector.

4. The hollow rotating shaft finishing method according to claim 1, wherein in the measurement step, an ultrasonic contact movable in the orthogonal direction is used to measure circumferential variations in thickness of the hollow rotating shaft by rotating the hollow rotating shaft about the virtual reference shaft center while bringing the ultrasonic contact into contact with the outer circumference of the hollow rotating shaft through an ultrasonic contact medium,
    a position measuring device is used to measure circumferential variations in position of the ultrasonic contact in the orthogonal direction, and
    the measurement by the ultrasonic contact and the measurement by the position measuring device are performed in the axial direction, and
    based on the results from the measurement by the ultrasonic contact and the measurement by the position measuring device, the deviation vector of the center position of the inner circumference of the hollow rotating shaft with respect to the virtual reference shaft center is calculated in the axial direction.

5. The hollow rotating shaft finishing method according to claim 1, further comprising an intermediate cutting step before the cutting step after the setting step, wherein the intermediate cutting step performs intermediate cutting for the outer circumference of the hollow rotating shaft in the axial direction with a finishing allowance left by giving the cutting tool a cut and moving the cutting tool in the axial direction relatively to the hollow rotating shaft while rotating the hollow rotating shaft about the virtual reference shaft center.

6. The hollow rotating shaft finishing method according to claim 1, wherein the hollow rotating shaft is a turbine shaft used in a gas turbine.

7. A hollow rotating shaft which is finished by the hollow rotating shaft finishing method according to claim 1.

\* \* \* \* \*